UNITED STATES PATENT OFFICE.

CHRISTIAN HANSEN, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING SULFUR AND SULFATES.

1,102,911.  Specification of Letters Patent.  Patented July 7, 1914.

No Drawing.  Application filed June 30, 1913.  Serial No. 776,581.

*To all whom it may concern:*

Be it known that I, CHRISTIAN HANSEN, doctor of philosophy, chemist, citizen of the German Empire, residing at Leverkusen, near Cologne-on-the-Rhine, Germany, have invented new and useful Improvements in Processes of Producing Sulfur and Sulfates, of which the following is a specification.

I have found that sulfur and sulfates can be obtained by heating with polythionates, solutions containing sulfites, bisulfites, or mixtures of these compounds with or without thiosulfates. The reactions proceed *e. g.* according to the following equations:

$$Na_2S_4O_6 + 2Na_2SO_3 = 3Na_2SO_4 + 3S,$$
$$2Na_2S_4O_6 + 2Na_2SO_3 + 2Na_2S_2O_3 = 6Na_2SO_4 + 8S,$$
$$Na_2S_4O_6 + 2NaHSO_3 = 2Na_2SO_4 + H_2SO_4 + 3S,$$
$$Na_2S_4O_6 + 2NaHSO_3 + 3Na_2S_2O_3 = 5Na_2SO_4 + 7S + H_2O.$$

In order to illustrate the new process more fully the following examples are given, the parts being by weight:

Example 1: A solution containing 100 parts of sodium tetrathionate, 77 parts of sodium bisulfite and 140 parts of sodium sulfite is heated to boiling. Sulfur separates. When the reaction is complete the resulting products are sulfate and sulfur. On using solutions which already contain polythionates the addition of these products is superfluous.

Example 2: A solution containing about 100 parts of potassium tetrathionate, or 90 parts of potassium trithionate, or a mixture of both, 210 parts of sodium thiosulfate, 416 parts of sodium bisulfite and 210 parts of potassium sulfite is heated to about 100° C. The precipitation of sulfur begins after about half an hour and is complete within a short time.

I claim:—

1. The process for producing sulfur and sulfates, which comprises heating solutions of a sulfite with a polythionate, substantially as described.

2. The process for producing sulfur and sulfates, which comprises heating solutions of a sulfite with a polythionate and a thiosulfate, substantially as described.

3. The process for producing sulfur and sulfates, which comprises heating solutions of a bisulfite with a polythionate, substantially as described.

4. The process for producing sulfur and sulfates, which comprises heating solutions of a bisulfite with a polythionate and a thiosulfate, substantially as described.

5. The process for producing sulfur and sulfates, which comprises heating solutions of a mixture of a sulfite and a bisulfite with a polythionate, substantially as described.

6. The process for producing sulfur and sulfates, which comprises heating solutions of a mixture of a sulfite and a bisulfite with a polythionate and a thiosulfate, substantially as described.

7. The process for producing sulfur and sodium sulfate, which comprises heating solutions of sodium sulfite with a polythionate, substantially as described.

8. The process for producing sulfur and sodium sulfate, which comprises heating solutions of sodium sulfite with a polythionate and a thiosulfate, substantially as described.

9. The process for producing sulfur and sodium sulfate, which comprises heating solutions of sodium bisulfite with a polythionate, substantially as described.

10. The process for producing sulfur and sodium sulfate, which comprises heating solutions of sodium bisulfite with a polythionate and a thiosulfate, substantially as described.

11. The process for producing sulfur and sodium sulfate, which comprises heating solutions of a mixture of sodium sulfite and bisulfite of sodium with a polythionate, substantially as described.

12. The process for producing sulfur and sodium sulfate, which comprises heating solutions of a mixture of sodium sulfite and bisulfite of sodium with a polythionate and a thiosulfate, substantially as described.

In testimony whereof I have hereunto set my hand in the presence of two subscribing witnesses.

CHRISTIAN HANSEN. [L. S.]

Witnesses:
HELEN NUFER,
ALBERT NUFER.